Nov. 5, 1940.  E. H. MUELLER  2,220,346
VALVE HANDLE
Filed March 14, 1938
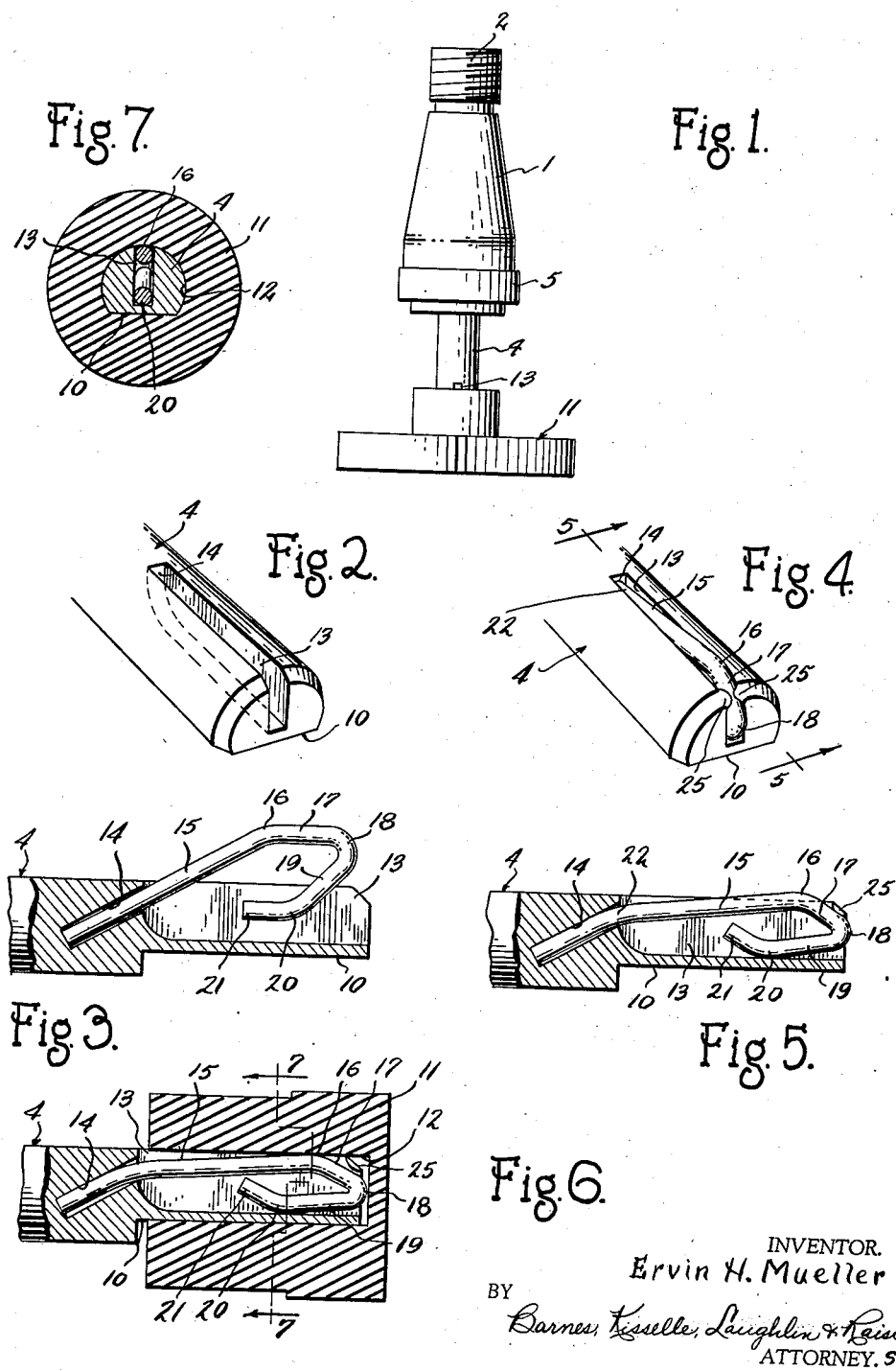
INVENTOR.
Ervin H. Mueller
BY
Barnes, Kisselle, Laughlin & Raisch
ATTORNEYS Patented Nov. 5, 1940

2,220,346

UNITED STATES PATENT OFFICE 2,220,346

VALVE HANDLE

Ervin H. Mueller, Detroit, Mich.

Application March 14, 1938, Serial No. 195,742

2 Claims. (Cl. 287—53)

This invention relates to valves, particularly of the type used as gas cocks on gas ranges or the like, and it has to do particularly with an improved arrangement for securing a handle to the valve stem.

In accordance with the invention, the stem for the valve member is shaped so as to fit into a recess or cavity in the handle so that the valve stem and handle are non-rotatably united, and a separate spring element in the form, for example, of a spring steel wire is embodied in the stem for exerting a frictional engagement between the stem and handle. This frictional engagement holds the stem and handle in assembly, although it permits the handle to be removed. One object of the invention is to provide an arrangement whereby, notwithstanding its small physical characteristics, strongly holds the handle in place and has a relatively long section which is subjected to stress, to the end that ample movement is provided. Moreover, the arrangement is such that the spring is preloaded in initial assembly to a point beyond that point where the spring would normally take a set.
This prevents the action of the spring taking a set after use, due to which, the frictional tendency would be materially lessened. This preloading of the spring beyond where it would take such a set results in the spring tendency remaining substantially the same throughout the life of the construction.

One form of construction for carrying out the invention is shown in the accompanying drawing wherein:
Fig. 1 is a plan view of a valve and handle in which the invention is embodied.

Fig. 2 is a detail perspective view of a portion of the stem.

Fig. 3 is a view in section illustrating the end portion of the stem and its formation, and the spring prior to final assembly and preloading.

Fig. 4 is a perspective view showing the final assembly of the spring and stem.

Fig. 5 is a sectional view taken substantially on line 5—5 of Fig. 4.

Fig. 6 is a sectional view similar to Fig. 5 showing the handle in place.

Fig. 7 is a sectional view taken substantially on line 7—7 of Fig. 6.
The body of the valve is generally illustrated at 1 and the particular form shown is a valve having an outlet 2, although the invention is not limited to a valve of this type. Inside the body of the valve is the usual tapered plug valve member equipped with a stem 4 which projects out through a cap 5. The valve body and valve member are, of course, well known to those versed in the valve art and are subject to change insofar as this invention is concerned.

The stem 4, as shown herein, is of the so-called D type in that its projecting end is cut away to form a flat surface 10. The handle 11 has a recess of similar D-shape so as to fit over the same as shown in Fig. 6, the recess being shown at 12, and thus the handle and stem are non-rotatable relative to each other.

The stem is slotted at 13 as by means of a milling operation, with the slot preferably disposed at right angles to the surface 10 and preferably centrally of the stem; and at the closed end of the slot, the stem is drilled to form an angularly disposed hole 14.

The spring element may take the form of a wire and may be round in cross section, and it has a straight portion 15, one end of which is designed to be located in the hole 14. The initial shape of the spring may be substantially as indicated in Fig. 3. As indicated, the spring has a bend 16 so as to form an angular portion 17 leading to a bight or reverse bend 18 which connects to another angular portion 19 similar to the portion 17. Another bend 20 may be located near the angular portion 19 so that the extreme end 21 is angularly disposed relative to the part 19. In assembling the spring and the stem, the spring is stressed to the position substantially as shown in Fig. 5. This flexes the portion 15 substantially at the point 22 and stresses the spring by partially collapsing the bight portion. The part of the spring arm substantially at the point 20 engages the bottom of the slot, and this partially closes the portion formed by the parts 17, 18 and 19 by stressing the spring at the bight. To hold the spring in this position the metal of the stem may be peened over as at 25 on opposite sides of the slot so as to overlie the spring as indicated in Fig. 5.

This fashioning of the spring from its normal shape, as shown in Fig. 3, to the shape shown in Fig. 5, preloads the same quite appreciably, and in fact stresses the spring beyond that point where it would normally take a set. When the handle is pushed into position the wall of the cavity 12 engages the portion 16 and the spring is further collapsed as illustrated in Fig. 6. The handle slips into place due to the fact that the portion 17 presents an inclined surface as shown in Fig. 5. After the handle has been placed on to the stem and removed therefrom several times, the spring stem exerts substantially all of its initial tension because of having been preloaded beyond the normal condition of spring set.

Although the spring is relatively short in overall dimensions it has a relatively long section which is stressed when the handle is pushed into position. The bight portion is further flexed, and all that part of the spring between the portion 22 and the portion 20 comprises a section which is stressed when the handle is positioned. The major force exerted by the spring upon the handle is delivered by that portion of the spring which includes the bight 18 and extends substantially from the points 16 to 20. Due to this arrangement a spring wire of quite small cross section may be used. To emphasize this point we might say that this construction differentiates from a relatively long spring securely fastened only at one end and which is flexed by a cantilever action. In other words the parts 15, 16 and 17 in Fig. 5 would be stressed by a cantilever action if these parts were supported only at the hole 14. But they are also supported by engagement of the part 20 with the wall at the bottom of the slot 13.

Moreover, the spring brings the flat surfaces of the stem and the recess in the handle into snug engagement so that these two parts are snugly engaged, and looseness in the form of relative rotation is practically eliminated.

I claim:

1. In a valve structure, a valve stem having a portion thereof D-shape in cross section, a handle provided with a recess having a similar D shape for fitting over the handle, said stem having a slot therein disposed substantially perpendicular to the flat side of the D and opening through the curved side, said slot terminating short of the length of the stem and said stem having a hole disposed angularly with respect to the axis of the stem and opening substantially into the closed end of the slot, a spring in the form of a length of wire having a bight portion with two arms extending therefrom, one arm being arranged to engage the wall at the bottom of the slot, the other arm having a bend and having its free end disposed in the hole, and the spring being stressed so that it lies substantially in the slot with the said bend projecting therefrom for engagement with a wall of a recess in the handle, and means for engaging and holding the spring stressed in the described position.

2. In a valve structure, a valve stem having a portion thereof D-shape in cross section, a handle provided with a recess having a similar D shape for fitting over the handle, said stem having a slot therein disposed substantially perpendicular to the flat side of the D, said slot terminating short of the length of the stem and said stem having a hole disposed angularly with respect to the axis of the stem and opening substantially into the closed end of the slot, a spring in the form of a length of wire having a bight portion with two parts extending therefrom and angularly away from each other, one part, substantially at its end, being arranged to engage the wall at the bottom of the slot, the other part substantially at its end being connected at a bend with a relatively long free end of the spring, said relatively long free end being disposed in the hole and the spring being stressed so that it lies substantially in the slot with the said bend projecting therefrom for engagement with a wall of a recess in the handle, and the metal of the stem being peened over one of the angularly extending parts to hold the spring in the described position and in stressed condition.

ERVIN H. MUELLER.